United States Patent [19]

Blackburn et al.

[11] 4,285,550
[45] Aug. 25, 1981

[54] WEIGHT TRANSFER ROLLER APPARATUS

[76] Inventors: Robert V. Blackburn, 11542 Luzon St., Cypress, Calif. 90630; Ian Blackburn, 16081 Gold Cir., Huntington Beach, Calif. 92647

[21] Appl. No.: 84,996

[22] Filed: Oct. 15, 1979

[51] Int. Cl.³ ............................................. F16C 29/04
[52] U.S. Cl. ...................................... 308/6 R; 16/25
[58] Field of Search ................... 308/6 R, 188, 189 R, 308/200, 227; 16/24, 25, 27

[56] References Cited

U.S. PATENT DOCUMENTS

| 2,770,831 | 11/1956 | Angelica et al. | 16/24 |
|---|---|---|---|
| 2,819,486 | 1/1958 | Dick | 16/24 |
| 3,478,382 | 11/1969 | Nosenzo | 16/24 |
| 4,060,252 | 11/1977 | Mowery | 308/6 R |

Primary Examiner—Lenard A. Footland

Attorney, Agent, or Firm—Fulwider, Patton, Rieber, Lee & Utecht

[57] ABSTRACT

There is disclosed a weight transfer roller apparatus including a barrel type housing formed on one extremity with a radially inwardly projecting retaining flange forming a circular protrusion opening. A roller ball is received within the bore of such barrel, has one side projecting from such opening, and has its opposite side nested on an annular high lubricity plastic ring formed with a bearing seat defining a sector of a sphere corresponding with the spherical roller. The annular bearing ring rests on a retainer secured to such housing whereby the housing may be mounted in a weight transfer platform and loads passing thereover will weight downwardly on such ball to be carried by the bearing ring. Preferably, the ball, annular bearing ring, and retainer are telescopically received in the bore of the barrel with the retainer being selectively removable for removal of the bearing and ball for replacement thereof upon deterioration or damage.

16 Claims, 7 Drawing Figures

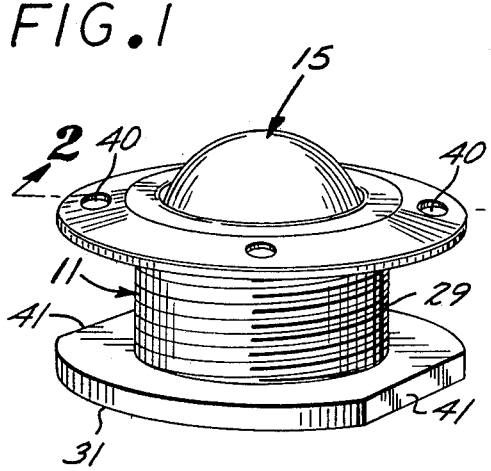
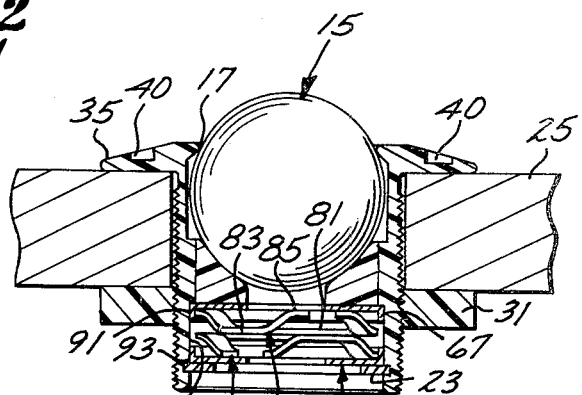
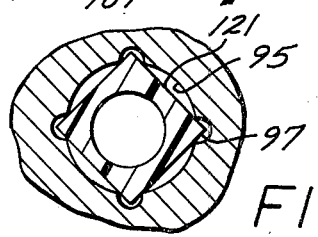
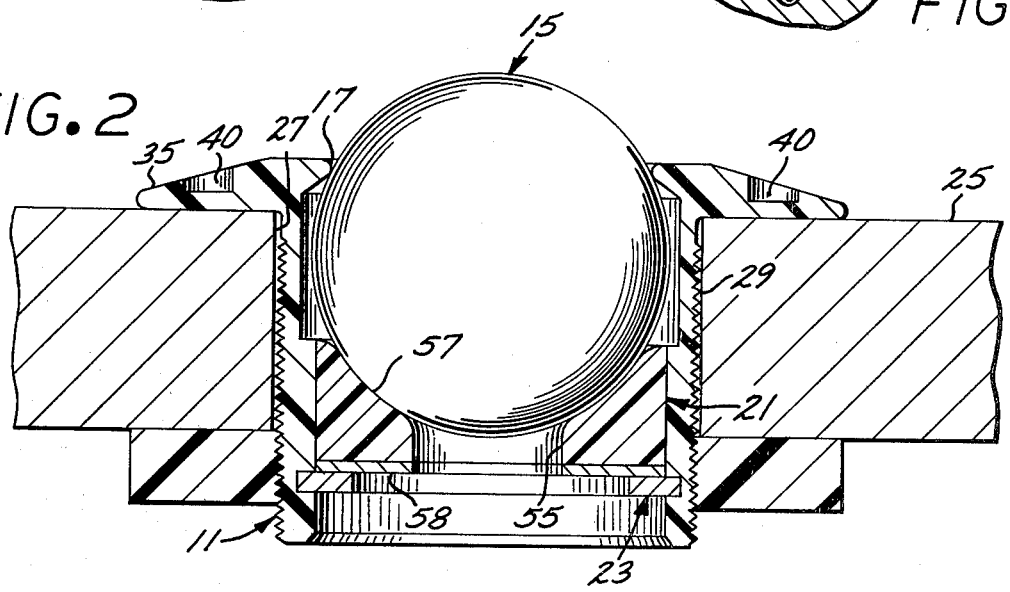

WEIGHT TRANSFER ROLLER APPARATUS

BACKGROUND OF THE INVENTION

1. Field of the Invention

The weight transfer roller of the present invention relates to rollers utilized for transporting heavy loads over a weight transfer platform, such as the floor in a cargo compartment of a cargo airplane.

2. Description of the Prior Art

With the advent of modern day air transportation, the rapid transfer of heavy loads into and out of cargo planes has become an important element of efficient shipping cargo throughout the world. In recent times, it has become common practice to pre-load cargo into containers commonly referred to as cargo containers, so such containers are prepared for rapid loading onto an arriving airplane so the plane itself can have a rapid turnabout and prevent detention on the ground for slow and time consuming piecemeal loading of individual items by themselves. The loading of such cargo planes has been facilitated by installing large diameter rollers in the floor of the cargo compartments thereof with the upper surfaces thereof protruding from the floor so a flat bottom cargo container can be slid easily and rapidly thereover to be tied down in position during flight. Such rollers have commonly incorporated individual housings installed in openings formed in the floor and typically incorporate a semi-spherical basket into which the roller is nested. Interposed between the roller and the semi-spherical basket are a large number, as for instance 60 or 70, small diameter ball bearings which facilitate rolling of the large diameter roller ball on the basket during transfer of heavy loads thereover. Such prior art metallic roller balls and housings suffer the shortcoming that they are relatively heavy, thus adding tremendously to the overall weight of the airplane when a great number of such assemblies are installed and add significantly to the consumption of fuel during flight. Moreover, such prior art roller transfer assemblies, while performing satisfactorily under ideal conditions, as for instance when the underside of the cargo containers are flat and uniform thus providing for even weight distribution over an entire array of roller assemblies disposed thereunder. Some prior art assemblies attempt to provide some cushioning and vertical flexibility in location of the roller ball by use of a coil spring which creates a dangerous condition at the time of disassembly. Furthermore, such prior art devices when operating in a debris ladened environment, pick up dirt, grit and other debris in the ball bearings interposed between the roller ball and nesting basket, thus resulting in literal grinding of the ball bearings with such debris and scarring of the roller ball and eventual failure of the roller ball to roll as a load is passed thereover. A still further shortcoming of such prior art roller transfer assemblies is that when any component thereof, such as the roller ball or roller bearings has failed, the entire assembly must be discarded because of the expense of disassembly and replacement of the components.

These and other objects and advantages of the present invention will become apparent from a consideration of the following detailed description when taken in conjunction with the accompanying drawings.

BRIEF DESCRIPTION OF THE DRAWINGS

FIG. 1 is a perspective view of a weight transfer roller apparatus embodying the present invention;

FIG. 2 is a transverse sectional view, in enlarged scale, taken along the line 2—2 of FIG. 1;

FIG. 3 is a transverse sectional view of a second embodiment of the weight transfer roller apparatus of the present invention;

FIG. 4 is a perspective view of a third embodiment of the weight transfer roller of the present invention;

FIG. 5 is a transverse sectional view, taken along the line 5—5 of FIG. 4;

FIG. 6 is a perspective view of the bearing ring incorporated in the weight transfer roller apparatus shown in FIG. 4; and, FIG. 7 is a transverse sectional view, taken along the line 7—7 of FIG. 5.

DESCRIPTION OF THE PREFERRED EMBODIMENTS

Referring to FIGS. 1 and 2, the weight transfer roller apparatus of the present invention includes, generally, a barrel-like housing 11 formed with a through internal bore 13 which receives telescopically thereinto, a roller ball 15 held captive on one side by a flange 17 formed at one end of the housing 11. The other side of the roller ball 15 rests on a bearing ring 21 which is preferably constructed of a plastic of high lubricity. The ball 15 and bearing ring 21 are retained in the barrel housing 11 by means of an annular snap ring, generally designated 23.

A series of transfer roller assemblies of the present invention may be installed in the floor 25 (FIG. 2), of a cargo plane such that a cargo container to be loaded thereonto may be transferred over an array of close spaced assemblies mounted in such floor. The floor 25 may have a series of large diameter bores 27 formed therein for receipt of the barrel housings 11. The housing 11 is preferably constructed of a durable lightweight high impact acetal thermoplastic such as those manufactured by polymerization of formaldehyde and marketed by Commercial Plastics & Supply Corp., Gardena, California, under the Trademark DELRIN. The barrel of the housing 11 is formed with an external thread 29 and may be projected downwardly through the bore 27 in the cargo plane floor 25 and have a lock nut 31 screwed onto the projecting lower end thereof. The top end of the housing 11, in addition to being formed with the radially inwardly projecting retaining flange 17, is formed with a radially outwardly projecting exterior mounting flange 35, the top surface of such flange projecting horizontally outwardly and then tapering downwardly and outwardly. The mounting flange 35 is formed with four upwardly opening blind bores 40 spaced equidistant thereabout for receipt of a spanner wrench. The retaining flange 17 forms a circular ball protrusion opening which, when the roller ball 15 is seated on the bearing ring 21, is slightly larger in diameter than the sector of ball registered therewith to thus permit free rolling of such ball upon a load being slid thereover.

The lug nut 31 may also be constructed of high impact acetal thermoplastic and is formed with a generally circular periphery having flats 41 (FIG. 1) formed on the opposite sides thereof.

The bore 13 in the housing 11, is reduced in diameter at 45 to closely fit the reduced in diameter bearing ring 21 and is formed below such bearing ring with an annular groove 51 for receipt of the retaining ring 23.

The bearing ring 21 is constructed of a thermoplastic having a high lubricity, such as the synthetic flourine polytetrafluorethylene, or the acetal resin with TFE fibres sold by Commercial Plastics & Supply Corp. under the Trademark DELRIN AF. The ring 21 is formed with a central, through, debris discharge opening 55 and is further formed with an upwardly opening concave bearing surface 57 defining a sector of a sphere the diameter of which corresponds with the diameter of the ball 15.

Referring to FIG. 3, the retaining ring 23 is in the form of a split ring constructed of spring steel having its opposite ends formed with bores (not shown) for receipt of circular prongs formed in the jaws of pliers for removal thereof.

The roller ball 15 is preferably of lightweight construction such as polystyrene, nylon, or may even be in the form of a hollow steel ball.

In operation, when it is desirable to install weight transfer roller assemblies of the present invention in the floor of a cargo plane, bores 27 are formed in the floor 25 in the desired array and the barrel housings 11 inserted therein. The lock nut 31 may then be screwed onto the lower ends of the barrel housings a distance determined by the floor thickness and a wrench engaged on the flats 40 (FIG. 1) to tighten such nut to the desired torque. The cargo container moved onto the cargo compartment floor 25 will then be carried on the tops of the roller balls 15 and will press such balls downwardly against the bearing surfaces 57 of the bearing rings 21. As such containers are pushed horizontally across the platform 25, the roller balls 15 will be free to roll on the bearing surfaces 57 of such rings 21 and such rolling will only be resisted by the relatively low coefficient of the friction for thermoplastic forming such rings 21. It will be appreciated that cargo containers moved into such cargo compartments may well carry dirt, gravel, salt, ice and snow into such cargo compartments and such debris will be introduced to the housing 11 and consequently to the bearing ring 21. The cargo compartments are frequently cleaned with a broom or air hose, thus resulting in circulation of such debris in the proximity of the roller balls 15 and introduction thereof into the housing 11. When the roller balls 15 are subsequently rotated under heavy load, the debris will be drawn over the surface of the bearing seat 57 to be discharged out the debris discharge opening 55 under the influence of gravity, thus preventing continual circulation of such debris within the housing 11 and consequent accelerated deterioration of the rolling surface of the ball 15 and of the bearing surface 57. Additionally, such bearing ring 21 will provide somewhat of a cushioning effect, over that which would be provided by metal to metal contact, and any heat built up therein will tend to dissipate through the discharge opening 55.

Should a roller ball 15 become damaged, a bearing ring 21 become worn, or the bearing surface 57 thereof become scarred by debris offering excessive resistance to rolling of the ball 15, the damaged component may easily be replaced. Such replacement merely involves the loosening of the lock nut 31 and removal of the housing 11 from the bore 27 and the housing may then be inverted and the retainer ring 23 removed. The backup ring 58, bearing ring 21, and roller ball 15 may then easily be removed out the open end of the housing 11. The damaged component may then be replaced by a new component and the entire assembly reassembled and installed in the cargo compartment floor 25. This procedure may be performed by relatively unskilled workmen and avoids the relatively high cost of replacing the entire assembly each time a single component is damaged or becomes deteriorated.

The weight transfer roller assembly shown in FIG. 3 is similar to that shown in FIG. 1 except that the housing 63 is longer than the housing 11 and is formed in its lower extremity with a counterbore 65 terminating in a downwardly facing annular limit shoulder 67. Inserted within the counterbore 65 and sandwiched between the bearing ring 21 and retainer ring 23 are a pair of finger spring washers 73 and 75 which act as compression springs resisting axial compression against the retainer ring 23.

The finger spring washers 73 and 75 are arranged in back-to-back relationship and are sandwiched between a pair of oppositely disposed spring retainer backup rings, generally designated 77 and 79. Each of the finger spring washers 73 and 75 are formed with a planar inner ring 81 which has formed integral therewith three annular tabs 83 disposed radially outwardly thereof, each tab being formed with annularly oppositely extending fingers 85 which project in opposite directions and angle axially away from the inner ring 81 and engage the respective spring retainer backup ring 77 or 79. Consequently, the fingers 85 act as cantilever springs resisting compression of the upper backup ring 77 toward the lower backup ring 79. The spring retainer backup rings 77 and 79 are formed on their outer peripheries with axially projecting annular flange 91 and 93 respectively, which receive therein the free extremities of the spring fingers 85 to maintain the finger spring washers 73 and 75 in position.

The shoulder 67 is located axially within the housing 63 to act as a limit against axially upward travel of the upper spring retainer backup ring 77 to prevent urging of the roller ball 15 against the retaining flange 17 so such retaining flange will not resist rolling of the ball. Consequently, the finger springs 73 and 75 may be preloaded to the desired level without pressing the roller ball 15 against the retainer flange 17 and restricting free rotation of the ball 15 when a load is initially applied thereto. In the preferred embodiment, the finger springs 73 and 75 provide for travel of the ball 15 downwardly approximately 0.10 inch under a load of 150 pounds.

In operation, when a cargo container is transferred onto the floor 25 of the cargo compartment, the balls 15 shown in FIG. 4 will be depressed downwardly a distance corresponding with the spring ratio of the finger spring washers 73 and 75 thus allowing compensation for unevenness in the bottom surfaces of such cargo containers by variable displacement of balls 15 at different locations under such container depending on the amount of unevenness encountered.

The weight transfer roller assembly shown in FIGS. 4 and 5 is similar to the assembly shown in FIG. 3 except that it is intended for installation through an opening 90 in a floor panel 89 and into an upwardly opening channel 91 located under such floor panel. The channel 91 has a bottom wall formed with a circular cutout 95 having radially projecting positioning sockets 97 formed therein at locations 45° apart. The weight transfer roller assembly shown in FIG. 5 includes, generally, a housing 101 in the form of a barrel having an interior bore 103 which is counterbored at 105 to form intermediate in such housing, a downwardly facing limit shoulder 107. Referring to FIG. 6, the bearing ring, generally designated 106, incorporated in the roller transfer apparatus shown in FIG. 4, is in the form of a ring having a cylindrically shaped exterior and is formed on its interior with a seat 108 defined by a sector of a sphere having a diameter that corresponds with the diameter of the roller ball 15. The seat 108 has a series of radially extending longitudinal, annularly spaced apart flutes 110 spaced thereabout to form grooves leading downwardly and inwardly within the seat. The ball 15, finger springs washers 73 and 75, and spring backup rings 77 and 79 are the same as that shown in FIG. 3. Rather than incorporating a retainer ring 23 however, this assembly incorporates a cylindrically shaped retainer plug 111 telescoped into the counterbore 105 and formed centrally with a debris discharge opening 107. Radial bores are formed in the diametrically opposite sides of the housing 105 and into the diametrical opposite sides of the plug 111 and roll pins 115 are inserted therein to hold the retainer plug 111 in position within the housing 101. The plug 111 is formed on its bottom side with a square-in-plan view positioning lug 121 which projects downwardly into the circular cutout 95. The corners of the positioning plug 121 are received in the index sockets 97 formed in the periphery of such circular opening 95 to facilitate in orienting the assembly upon installation thereof.

A pair of vertically extending, radially outwardly opening slots 131 are formed in the diametrically opposite sides of the housing 101 and have received therein respective elongated spring wire clasps, generally designated 133. The lower extremity of such catches 133 are received in a vertical bore 135 formed in the housing 101 at the bottom ends of such slots 131 and such clasps angle radially outwardly and upwardly from the top extremities of such bores 135 to project beyond the outer periphery of such housings and are then bent back to extend radially inwardly and form an upwardly facing retention shoulder 137. The wire clasps then turn upwardly on their radially inner extremities to form vertical tips 141.

In operation, the weight transfer roller assembly shown in FIG. 5 may be installed in a floor panel 89 by insertion therethrough and into the channel 91 with the corners of the lug 121 registered in the radially projecting index sockets 97 and, as the housing 101 is pressed downwardly through the panel 89, the clasps 133 will engage the opposite sides of the opening 90 to thus have the upper extremities thereof urged inwardly to enable the outer extremities of the shoulders 137 to clear the panel 89. The bottom of the housing 101 will then come to rest on the bottom wall of the channel 81 and each clasp upon clearing the panel 89, will then flex radially outwardly to engage the shoulders 137 beneath the panels to hold the housings 101 firmly in position.

Weight then applied to the roller balls 15 will be supported through the housings 101 and bottom walls of the channels 91. As the roller 15 is rotated, any dirt, grit or other debris caught between the surface of such ball and the bearing surface 108 will be carried annularly about such bearing surface 108 until such time as it is registered with a flute 110. Upon depositing the dirt or grit in the flute 110, such dirt or grit will be free to fall downwardly therein under the influence of gravity to thus be discharged from the bottom of the housing. Such flutes 110 are sized and spaced about the bearing seat 108 to form approximately 39% of the overall area of the sector of the circle formed in the bearing ring 106 to thus reduce the overall bearing surface and, consequently, the friction developed. Moreover, the flutes 110 serve as air passages to circulate air therethrough, thus transferring any heat built up in the bearing ring 106 away to the atmosphere. Should it become desirable to remove the housings 101 for repair or other servicing, turned up tips 141 may be engaged and the upper extremities of such clasps drawn radially together to draw the shoulders 137 radially inwardly to clear the passages of the opening 90 in the panel 89. The housing 101 may then be lifted upwardly and the roll pins 115 removed to rightful removal of each of the components and replacement thereof as required.

From the foregoing, it will be apparent that the weight transfer roller assembly of the present invention provides a lightweight unit with a bearing ring that will prevent the roller ball from locking up in relationship to its bearings and the various components of the assembly may be then quickly and conveniently replaced by a selectively unskilled workman. The assembly is readily installed in floor panels of different thicknesses and compensates for unevenness in bottoms of cargo containers. Furthermore, such assemblies may be disassembled without the normal dangers attendant unrestrained release of coil compression springs commonly utilized in the prior art to compensate for axial shifting of weights.

We claim:

1. Weight transfer roller apparatus for mounting on a platform defined by a wall having a through wall bore formed therein and comprising:
   a housing including an elongated barrel formed to be received telescopically in said bore and further formed with a ball-receiving bore and having oppositely disposed first and second extremities, said first extremity being formed with an annular radially outwardly flared flange for overlying the marginal edges of one end of said wall bore and said barrel being further formed with exterior threads;
   an interior threaded nut for screwing onto said second extremity of said barrel;
   a radially inwardly projecting retaining flange formed on said first extremity and defining a circular protrusion opening concentric with said ball-receiving bore;
   a cylindrical low friction thrust bearing means disposed intermediately in said ball-receiving bore and formed with a spherically-shaped concave bearing seat opening toward said one extremity;
   a spherical roller ball received in said ball-receiving bore and nested on one side directly on said bearing seat and projecting on its opposite side from said protrusion opening; and,
   retainer means in said second extremity of said bore and engaging said barrel to hold said roller ball captive between said retaining flange and bearing means whereby said housing can be affixed to said platform with said one side of said roller ball projecting from said protrusion opening and when a weight is applied to said ball it will be substantially uniformly supported by such spherically-shaped concave bearing seat.

2. A weight transfer roller apparatus as set forth in claim 1 that includes:
   mounting means on said housing, including axially extending radially outwardly opening slots formed in the opposite exterior sides of said housing and respective spring catches disposed therein, each being in the form of a longitudinally projecting spring rod mounted on one end to said housing within the respective slot and then angling radially outwardly to project to a point radially outward of the radially outer extreme of said housing and then being turned radially back inwardly to form on its free extremity a radially extending catch shoulder.

3. A weight transfer roller apparatus as set forth in claim 1 that includes:
longitudinally compressible compression spring means interposed between said bearing means and retainer for compression when said ball is loaded to permit partial retraction of said ball into said bore.

4. A weight transfer roller apparatus as set forth in claim 1 wherein:
said barrel is formed at said second end with a counter bore having a diameter greater than the exterior diameter of said bearing means leading to an annular limit shoulder laterally aligned with said bearing means and facing toward said second end; and,
axially compressible circular compression spring means telescopically received in said counter bore and including a spring retainer ring having a diameter greater than that of said limit shoulder abutted on its periphery against said limit shoulder and held pressed against said shoulders by said retainer.

5. A weight transfer roller apparatus as set forth in claim 1 wherein:
said nut is formed with a circular exterior having a pair of flats formed on diameterically opposite sides thereof.

6. A weight transfer roller apparatus as set forth in claim 1 wherein:
said thrust bearing means is formed with a plurality of radially extending flutes spaced about said bearing seat.

7. Weight transfer roller apparatus for mounting on a platform and comprising:
a housing including an elongated cylindrical barrel having first and second ends, said barrel being formed with an interior cylindrical ball receiving bore of a predetermined minimum diameter;
a retaining flange formed on said first end of said barrel defining a circular ball protrusion opening concentric with said bore and having a diameter smaller than said predetermined minimum diameter of said ball receiving bore;
a roller ball received telescopically in said bore from said open second end and having a diameter less than said predetermined minimum diameter but greater than the diameter of said ball protrusion opening;
thrust bearing means received telescopically in said bore from said second end and including spherically shaped low friction concave socket means seated against said ball; and,
a retainer telescoped into the open end of said socket means and including releasable fastening means releasably engaging said barrel to hold roller ball captive between said thrust bearing means and said retaining flange whereby said housing may be mounted on said platform with said ball protruding therefrom for receiving the weight of loads transferred over said platform and when it is desirable to disassemble said apparatus said fastening means may be released and said retainer removed to free said thrust bearing means and roller ball for removal out the open end of said socket.

8. A weight transfer roller apparatus as set forth in claim 7 that includes:
longitudinally compressible compression spring means interposed between said bearing means and retainer for compression when said ball is loaded to permit partial retraction of said ball into said bore.

9. A weight transfer roller apparatus as set forth in claim 7 wherein:
said bearing means is formed centrally with a through open ended debris discharge leading from said seat.

10. A weight transfer roller apparatus as set forth in claim 7 wherein:
said thrust bearing means is in the form of a low friction annular bearing ring telescopically received in concentric relationship in said barrel and formed with an integral bearing face forming a sector of a sphere having a diameter equal to the diameter of said roller ball.

11. A weight transfer roll apparatus as set forth in claim 7 wherein:
said barrel is formed at said second end with a counter bore having a diameter greater than the exterior diameter of said bearing means leading to an annular limit shoulder laterally aligned with said bearing means and facing toward said second end; and,
axially compressible circular compression spring means telescopically received in said counter bore and including a spring retainer ring having a diameter greater than that of said limit shoulder abutted on its periphery against said limit shoulder and held pressed against said shoulders by said retainer.

12. A weight transfer roller apparatus as set forth in claim 7 that includes:
mounting means on said housing, including axially extending radially outwardly opening slots formed in the opposite exterior sides of said housing and respective spring catches disposed therein, each being in the form of a longitudinally projecting spring rod mounted on one end to said housing within the respective slot and then angling radially outwardly to project to a point radially outward of the radially outer extreme of said housing and then being turned radially back inwardly to form on its free extremity a radially extending catch shoulder.

13. A weight transfer roller apparatus as set forth in claim 7 wherein:
said retainer is in the form of a plug closely fitting the interior of said bore and said fastening means includes radially extending bores extending through the wall of said housing and into said plug and, further, includes roll pins releasably inserted into said radially extending bores.

14. A weight transfer roller apparatus as set forth in claim 7 wherein:
said bearing ring is constructed of a plastic having high lubricity, low friction, and low wear characteristics.

15. Weight transfer roller apparatus for mounting on a platform and comprising:
a housing including an elongated barrel formed with a ball-receiving bore having oppositely disposed first and second extremities and including an interior locking groove;

a radially inwardly projecting retaining flange formed on said first end and defining a circular protrusion opening concentric with said bore;

a cylindrical low friction thrust bearing means disposed intermediately in said bore and formed with a spherically-shaped concave bearing seat opening toward said one extremity;

a spherical roller ball received in said bore and nested on one side directly on said bearing seat and projecting on its opposite side from said protrusion opening; and, a radially expandable circular retainer lock ring in said groove and engaged on one side by said bearing means to hold said roller ball captive between said retaining flange and lock ring whereby said housing can be affixed to said platform with said one side of said roller ball projecting from said protrusion opening and when a weight is applied to said ball it will be substantially uniformly supported by such spherically-shaped concave bearing seat.

16. Weight transfer roller apparatus for mounting on a platform and comprising:

a housing including an elongated barrel formed with a ball-receiving bore having oppositely disposed first and second extremities;

a radially inwardly projecting retaining flange formed on said first end and defining a circular protrusion opening concentric with said bore;

a cylindrical low friction thrust bearing means disposed intermediately in said bore and formed with a spherically-shaped concave bearing seat opening toward said one extremity and formed centrally with a through open ended debris discharge opening leading from said seat;

a spherical roller ball received in said bore and nested on one side directly on said bearing seat and projecting on its opposite side from said protrusion opening; and, retainer means in said second extremity of said bore and engaging said barrel to hold said roller ball captive between said retaining flange and bearing means whereby said housing can be affixed to said platform with said one side of said roller ball projecting from said protrusion opening and when a weight is applied to said ball it will be substantially uniformly supported by such spherically-shaped concave bearing seat.

* * * * *